(12) United States Patent
Viswanathan et al.

(10) Patent No.: US 11,109,080 B2
(45) Date of Patent: Aug. 31, 2021

(54) METHOD AND DEVICE FOR DELIVERING A CONTENT

(71) Applicant: Interdigital CE Patent Holdings, Paris (FR)

(72) Inventors: Subha Viswanathan, Chennai (IN); Sreedevi Srinivasan, Chennai (IN)

(73) Assignee: Interdigital CE Patent Holdings, Paris (FR)

( * ) Notice: Subject to any disclaimer, the term of this patent is extended or adjusted under 35 U.S.C. 154(b) by 147 days.

(21) Appl. No.: 16/133,628

(22) Filed: Sep. 17, 2018

(65) Prior Publication Data

US 2019/0089995 A1 Mar. 21, 2019

(30) Foreign Application Priority Data

Sep. 18, 2017 (EP) ..................................... 17306205

(51) Int. Cl.

| | |
|---|---|
| *H04N 21/2387* | (2011.01) |
| *H04N 21/845* | (2011.01) |
| *H04N 21/4402* | (2011.01) |
| *H04N 21/262* | (2011.01) |
| *H04N 21/81* | (2011.01) |
| *H04N 21/432* | (2011.01) |
| *H04N 21/61* | (2011.01) |
| *H04N 21/84* | (2011.01) |
| *H04N 21/6587* | (2011.01) |
| *H04N 21/458* | (2011.01) |
| *H04N 21/472* | (2011.01) |

(52) U.S. Cl.
CPC ... *H04N 21/2387* (2013.01); *H04N 21/26258* (2013.01); *H04N 21/4325* (2013.01); *H04N 21/440281* (2013.01); *H04N 21/458* (2013.01); *H04N 21/47217* (2013.01); *H04N 21/6125* (2013.01); *H04N 21/6587* (2013.01); *H04N 21/812* (2013.01); *H04N 21/84* (2013.01); *H04N 21/8455* (2013.01); *H04N 21/8456* (2013.01)

(58) Field of Classification Search
CPC .......... H04N 21/2387; H04N 21/6587; H04N 21/84; H04N 21/6125; H04N 21/8456; H04N 21/4325; H04N 21/812; H04N 21/26258; H04N 21/440281; H04N 21/8455; H04N 21/47217; H04N 21/458
See application file for complete search history.

(56) References Cited

U.S. PATENT DOCUMENTS

| | | | |
|---|---|---|---|
| 6,760,536 B1 | 7/2004 | Amir et al. | |
| 7,440,674 B2 | 10/2008 | Plotnick | |
| 2004/0033053 A1* | 2/2004 | Chen | ........................ H04N 5/76 |
| 2004/0221311 A1* | 11/2004 | Dow | ....................... H04N 5/445 |
| 2005/0076359 A1 | 4/2005 | Pierson et al. | |
| 2007/0248314 A1* | 10/2007 | Iggulden | .................. H04N 5/91 |

(Continued)

*Primary Examiner* — Anthony Bantamoi
(74) *Attorney, Agent, or Firm* — Invention Mine LLC

(57) ABSTRACT

This method for delivering a multimedia content, said multimedia content including at least one second content, includes, during the rendering of the multimedia content, detecting a start of the second content, performing a fast-forward with a controlled speed during the rendering of the second content, in which the speed is controlled such that at least one representative frame of the second content is completely rendered, detecting an end of the second content, and stopping the fast-forward.

20 Claims, 2 Drawing Sheets

(56) References Cited

U.S. PATENT DOCUMENTS

| | | |
|---|---|---|
| 2008/0206732 A1 | 8/2008 | Zalewski |
| 2010/0172626 A1 | 7/2010 | Lee |
| 2014/0020017 A1 | 1/2014 | Stern |
| 2014/0181667 A1* | 6/2014 | Chen .................... G06F 3/0484 |

* cited by examiner

METHOD AND DEVICE FOR DELIVERING A CONTENT

REFERENCE TO RELATED EUROPEAN APPLICATION

This application claims priority from European Patent Application No. 17306205.0, entitled "METHOD AND DEVICE FOR DELIVERING A CONTENT", filed on Sep. 18, 2017, the contents of which are hereby incorporated by reference in its entirety.

TECHNICAL FIELD

The present disclosure generally relates to the field of content distribution and delivery. More particularly, the disclosure deals with the selective delivery and play of a content, such as an advertising delivered during a break in a TV program. Thus, the disclosure concerns a method for delivering a content and a corresponding delivering device. It further concerns a computer program implementing the delivering method of the disclosure.

BACKGROUND OF THE DISCLOSURE

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A survey reveals that most people watching time-shifted TV programs fast-forward the secondary content, i.e. generally advertisements, played during the breaks. Also, a big number of users download or record TV programs in order to have the possibility to skip commercials. This is understandable, as users generally no longer have the patience to sit through a four-minute pod of eight 30-second sales pitches every 20 to 30 minutes.

Thus, it seems clear that unduly long periods of advertisements or promotions with repetitions represent a source of frustration for users. Further, by resorting to recording, users shorten the watch of advertisements by using trick modes.

The main disadvantage of using trick modes in the secondary content is that the user needs to have his remote in his hand and to keep his eyes on TV in order to perform trick modes. Indeed, while performing 32× or 16× or 8× Fast Forward (FF), there is a risk that the first few frames of the primary content, i.e. the show that the user is watching, gets skipped before the play button is pressed. Thus, the user must perform back and forth Rewind (REW) and FF operations in order to restart viewing the primary content. The user solves this problem intuitively as represented in FIG. 1 showing the playing of a recorded first content 2 in which is inserted a secondary content consisting in a series of advertisements 4, 6, 8, 10. The user uses initially the fast-forward mode at a speed 32× and then gradually reduces the speed until 2×. Each time that the user misses the resume of the first content 2, he is obliged to operate a rewind. This defeats the purpose of relaxed watching especially when the secondary content pops up on every 20 to 30 minutes.

As a result, the effectiveness of TV advertisements is slowly withering away while TV remains one of the favorite supports for the advertisers to promote products and/or services apart from the emerging OTT (Over-The-Top) content.

Thus, there is a need for a solution in order to have a balance between advertisers interests and the quality of user experience.

US20140020017 describes a selective enforcement of second content viewing according to a choice of the user who has the ability to select from a plurality of options for treatment of the secondary content, such as, e.g., skipping, saving for later, watching, etc.

There are also some target advertising solutions which aim to reduce the probability that the consumer skips or fast forwards the secondary content by showing only advertisements with interest to the consumer, for instance according to the type and the demographics of the viewing audience of the TV program being watched.

There are also methods, such as in U.S. Pat. No. 7,440,674, that present a shorter alternative advertisement in a split screen when the user attempts to skip the secondary content.

There has also been a commercial skip feature present in VCRs and DVRs that allows the user to automatically skip advertisements. But, this solution does not address the advertiser's interests.

Furthermore, there are some advertisements created in such a way that even if the user fast forwards, the message of the advertisement is delivered through to the end user. An example is the "Slowmercial", where the movement is relatively static, so that even when fast-forwarded the viewer still sees the advertisement.

Above methods are either not effective in getting the advertisers message across to the viewers or do not enhance the customer experience.

SUMMARY OF THE DISCLOSURE

The present disclosure proposes a solution for improving the situation.

Accordingly, the present disclosure provides a method, implemented by a renderer device, for delivering a multimedia content, said multimedia content including at least one second content, the method comprising, during the rendering of the multimedia content:

detecting a start of the second content;
performing a fast-forward with a controlled speed during the rendering of the second content, in which the speed is controlled such that at least one representative frame of the second content is completely rendered;
detecting an end of the second content; and
stopping the fast-forward.

The method of the present disclosure does not need any action from the user side. Thus, the user experience is improved while the interests of the second content provider are kept, as at least one representative frame of the second content is watched by the user. Thus, this solution ensures the user's convenience of relaxed viewing in tandem with the provider's interest by showing critical frames of the second content. This is especially interesting when the second content is an advertisement.

Advantageously, the method includes monitoring metadata associated with the multimedia content.

Preferably, the metadata contains information related to:
the start and end time of the second content;
the position of the representative frame in the second content.

According to an embodiment, the multimedia content is a video stream and the metadata includes manifest files.

According to another embodiment, the multimedia content is a broadcast content and the metadata is embedded in-band or out-of-band.

For instance, the broadcast content is streamed via cable in radio frequencies typically between 80 MHz and 800 MHz. In in-band, the metadata is embedded within the multimedia content using, for example, the private sections allowed by the MPEG format.

Advantageously, the speed of fast-forward is varied according to a normal distribution if the second content includes at least one representative frame positioned at the beginning of the second content and at least one representative frame positioned at the end of the second content.

According to an embodiment, the speed of fast-forward is varied according to an exponential distribution if the second content includes at least one representative frame positioned only at the beginning of the second content.

Alternatively, the speed of fast-forward is varied according to a negative exponential distribution if the second content includes at least one representative frame positioned only at the end of the second content.

Advantageously, when the second content includes a plurality of representative frames distributed at a plurality of positions of the second content, the method includes:

splitting the second content into a plurality of samples, in which each representative frame is positioned at the end of a corresponding sample; and controlling the speed of fast-forward according to a negative exponential distribution within each sample.

Preferably, the speed of fast-forward depends on the duration of the second content.

The disclosure also provides a renderer device, for delivering a recorded multimedia content, said multimedia content including at least one second content, the renderer device comprising at least one processor configured, during the rendering of the multimedia content, to:

detect a start of the second content;

perform a fast-forward with a controlled speed during the rendering of the second content, in which the speed is controlled such that at least one representative frame of the second content is completely rendered;

detect an end of the second content; and stop the fast-forward.

This device is for instance a set-top box or a television set or a digital video recorder, DVR, or a tablet or a smartphone.

The method according to the invention may be implemented in software on a programmable apparatus. It may be implemented solely in hardware or in software, or in a combination thereof.

For instance, it may be used in an application downloaded in a renderer device.

Since the present invention can be implemented in software, the present invention can be embodied as computer readable code for provision to a programmable apparatus on any suitable carrier medium. A carrier medium may include a storage medium such as a floppy disk, a CD-ROM, a hard disk drive, a magnetic tape device or a solid state memory device, a flash or optical memory, a cloud based storage and the like.

The disclosure thus provides a computer-readable program including computer-executable instructions to enable a computer to perform the delivering method of the present disclosure.

The diagram of FIG. 3 illustrates an example of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which.

DETAILED DESCRIPTION OF PREFERRED EMBODIMENTS

Figure 1:
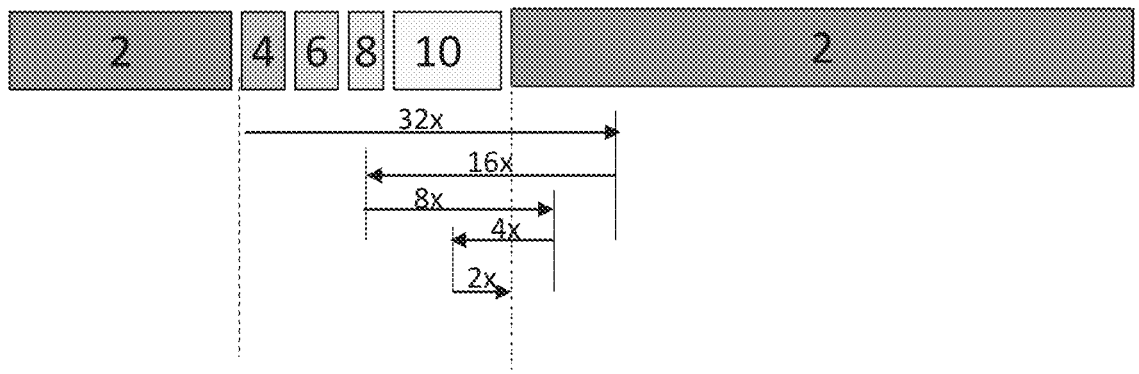
FIG. 1, already described, is a schematic view showing the existing use of a trick mode to skip a secondary content.
Figure 2:
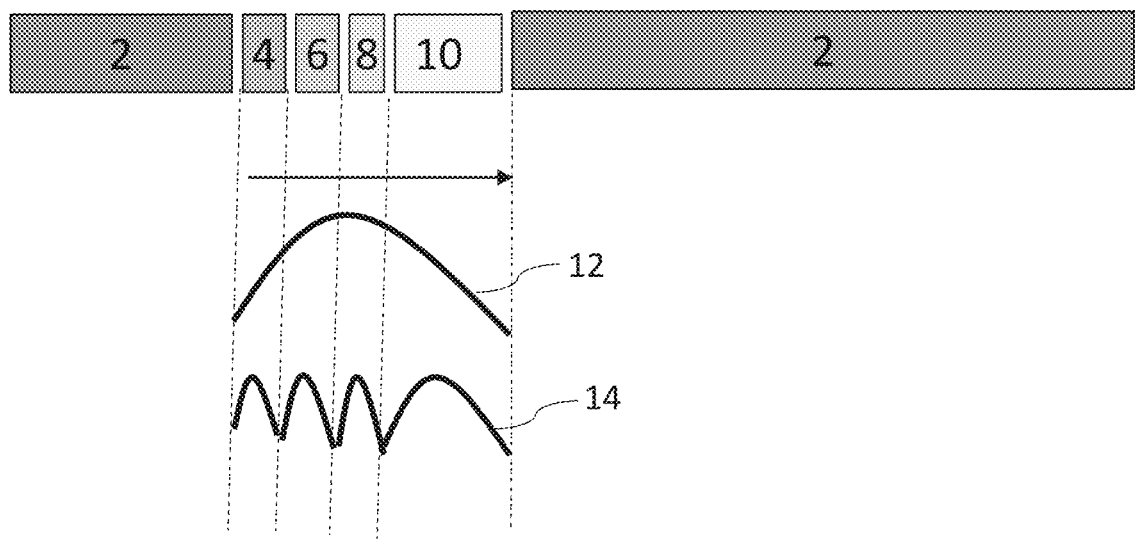
FIG. 2 is a schematic view showing the use of the trick mode according to an embodiment of the present disclosure.

FIG. 2 shows the renderings, i.e. the playing of the recorded first content 2, i.e. the primary content, in which is inserted a series of advertisements 4, 6, 8, 10 constituting a second content, i.e. the secondary content.

According to the present disclosure, as soon as the start of the second content is detected, the trick mode is triggered either automatically or further to a request of the user. The trick mode rate representing the speed of fast-forward is controlled or varied automatically during the playing of the second content.

According to a first embodiment, the variation of the speed of the fast-forward playing follows a distribution function represented by the curve 12, such that at least one representative frame of the whole second content containing the advertisements 4, 6, 8, 10 is completely rendered.

Here, it is meant by representative frame a critical frame that is considered by the provider as important to be seen by the user. In the case of an advertisement, it may for example show the name of the advertised product or service.

According to a second embodiment, the variation of the speed of the fast-forward playing follows a distribution function represented by the curve 14, such that at least one representative frame of each advertisement 4, 6, 8, 10 is completely rendered.

Advantageously, the speed of fast-forward is varied according to a normal distribution if the second content includes at least one representative frame positioned at the beginning and at least one representative frame positioned at the end of the second content. The peak trick mode rate happens in the middle of the total time of the second content duration. As the time goes beyond the middle, the trick mode rate decreases from 32× to 0× based on a normal distribution.

For example, any advertisement within the 1st standard deviation of the normal distribution would be the highest trick mode rate of 32×. Then, the timestamp between the first and the second standard deviation would have the next level trick mode of 16× while the timestamp between the 2nd and 3rd standard deviation content would have an 8× trick mode. Then after the 4th or 5th standard deviation, the play of the first content starts.

However, if the representative frames appear only at the beginning of the second content, the speed of fast-forward is advantageously varied according to an exponential distribution.

Similarly, if the representative frames appear only at the end of the second content, the speed of fast-forward is advantageously varied according to a negative exponential distribution.

According to an embodiment, if none of the distribution algorithm applies, i.e. when the second content includes a plurality of representative frames distributed at a plurality of positions of the second content, the second content is split into a plurality of samples, in which each representative frame is positioned at the end of a corresponding sample and the speed of fast-forward is varied according to a negative exponential distribution within each sample.

Advantageously, the granularity of trick mode rates is calculated based on the duration of the secondary content rendering. If this duration is high, the trick mode rates may vary up to 32× whereas if the range is low, the trick mode rates may vary only up to 8×.

Table 1 provides the approximation durations of the rendering of secondary contents of 1 and 2 minutes for different trick mode rates:

TABLE 1

| Trick mode rate | Frames per second | Approx. Duration for a 1 min secondary content | Approx. Duration for a 2 min secondary content |
|---|---|---|---|
| X | 30 FPS | 64 | 128 |
| 2X | 60 FPS | 32 | 64 |
| 4x | 120 FPS | 16 | 32 |
| 8X | 240 FPS | 8 | 16 |
| 16X | 480 FPS | 4 | 8 |
| 32X | 960 FPS | 2 | 4 |

Thus, based on the capability of the renderer device and on the user's preference, the maximum speed used for playing that the secondary content using a track mode may be decided based on Table 1.

Also, as represented in FIG. 2, it may be advantageous to make the variation of the speed of the fast-forward playing follow a distribution function represented by the curve 14, i.e. a succession of curves following one of the above described distributions, such that at least one representative frame of each advertisement 4, 6, 8, 10 is completely rendered.

Figure 3:
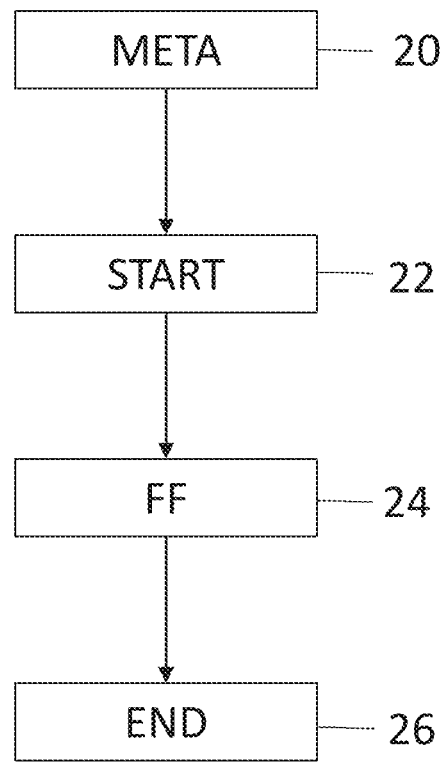
FIG. 3 is a flowchart is a flowchart showing the steps of the method for delivering a multimedia content according to an embodiment of the present disclosure.

The flowchart of FIG. 3 illustrates the steps of the method for delivering multimedia content according to an embodiment of the present disclosure.

According to this embodiment, the method of the present disclosure uses metadata associated with the multimedia content.

Preferably, these metadata include the start time and end time of each of the first content and the second content, and timestamps of the representative frames in the second content.

These metadata are inserted in the form of a file, such as the following MAP file which is typically a plain text file with a .MAP extension:

| <Start Timestamp>-<End Timestamp> |
|---|
| <1:10>-<1:40> |
| <10:45>-<11:20> |
| <15:45> |
| <16:00> |
| <16:05> |
| <16:17> |
| <16:19> |
| <16:22> |
| <22:00> |

This indicates that from the start of the second content, at the time offset of 1:10 to 1:40 and at the time offset of 10:45 to 11:20 there are representative frames that must be played at a normal play speed. There are also representative frames at each of the other indicated timestamps above.

The MAP file may be sent directly to the rendered device. This is preferably the case, for example, in an IP based transmission system such as Adaptive Bit Rate (ABR) streaming or Over The Top (OTT) video delivery, where REST (REpresentational State Transfer) Application Program Interfaces (API) are used.

The renderer device may also generate the MAP file at its side. For example, in the case where the metadata is inserted in an MPEG-2 content, the renderer device generates the MAP file by parsing the MPEG-2 content.

For Adaptive BitRate (ABR) content which is generally the video that is streamed via HTTP, the metadata content is in the form of manifest files in which the representative frame information is inserted.

Thus, when playing the multimedia content, the renderers device monitors, at step 20, the metadata associated with the content. This step may consist on reading the MAP file described above.

Then, at step 22, using the start time of the second content included in the metadata, the renderer device detects the start of the second content and triggers the trick mode playing.

At step 24, using the time positions of the representative frames included in the metadata, the renderer device performs a fast-forward with a varying speed during the playing of the second content. The renderer device varies automatically the speed, without any user intervention, such that at least one representative frame of the second content is completely rendered.

Then, at step 26, using the end time of the second content included in the metadata, the renderer device detects the end of the second content and stops the trick mode playing.

Figure 4:
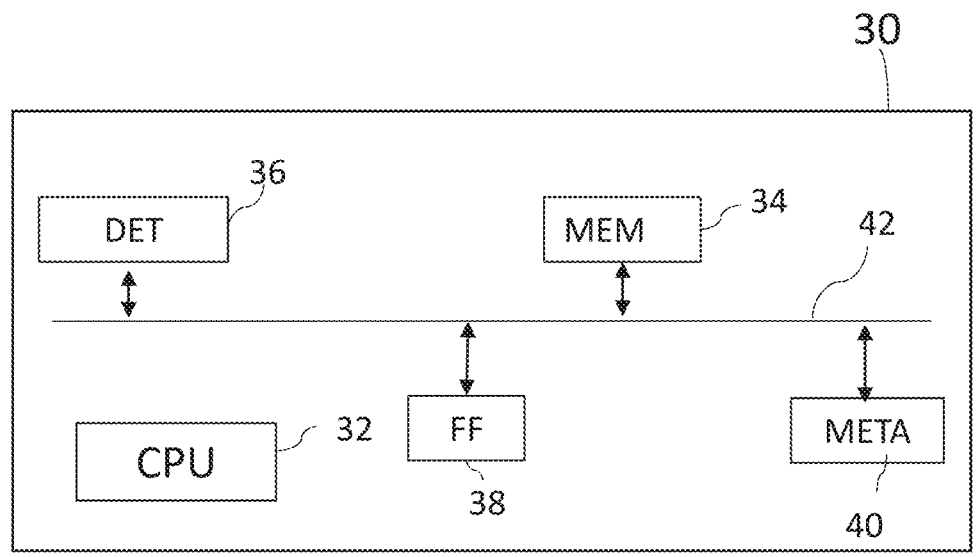
FIG. 4 is a schematic view illustrating a renderer device, according to an embodiment of the present disclosure.

FIG. 4 is a block diagram of an exemplary embodiment of a renderer device 30 implementing the method of the present disclosure.

Advantageously, the renderer device 30 includes one or more processors 32 and a memory 34.

The renderer device 30 includes:

a detecting module 36 configured to detect a start and/or an end of the second content; and a fast-forward module 38 configured to perform a fast-forward with a varying speed during the rendering of the second content.

According, to an embodiment the renderer device 30 also includes a metadata module 40 configured to read a file of metadata received by the rendered device 30 and stored in the memory 34 and/or to generate a file of metadata.

These modules are advantageously implemented by the CPU 32.

According to the represented embodiment, a bus 42 provides a communications path between various elements of the device 30. Other point-to-point interconnection options (e.g. non-bus architecture) are also feasible.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention is not limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

A person skilled in the art will readily appreciate that various parameters disclosed in the description may be modified and that various embodiments disclosed and/or claimed may be combined without departing from the scope of the invention.

For example, even if the above description considered advertisements as the main example of second content, the present disclosure method may be implemented for other cases of second content.

For instance, in the case where the content is a comedy in which there are some music parts, the music parts may be considered as a second content that the user wishes to skip by applying the present disclosure teachings.

According to an embodiment, further to having a default setting considering the advertisements and promotional videos as secondary content, a other user settings may be implemented so that the user has the possibility to indicate either content that interests him or content that he wants to avoid and that will be considered as a secondary content. This is preferably based on the genre preferences indicated by the user.

For instance, the user may decide to skip action or comedy or romance or songs or any other genre frames within a media content.

Also, the method of the present disclosure may be used in the case of catch-up of live TV. From the moment that the user presses "pause" to the moment where he tries to catch-up, the above method may be used for the viewing of a secondary content within the live program.

According to a variant, especially in the absence of metadata associated with the multimedia content, the user may indicate the start of the second content to the renderer device, which triggers the execution of the method of the disclosure. The user also indicates the end of the second content. This means that the detecting steps of the start and end of the second content correspond to the reception of the indications of start and end from the user.

What is claimed:

1. A method, implemented by a renderer device, for delivering a multimedia content, the multimedia content including at least one second content, the method comprising, during rendering of the multimedia content:
   detecting, by the renderer device, a start of the second content;
   performing, by the renderer device, a fast-forward with a controlled variable speed during the rendering of the second content, in which the speed is controlled such that at least one representative frame of the second content is completely rendered;
   detecting, by the renderer device, an end of the second content; and
   stopping, by the renderer device, the fast-forward.

2. The method of claim 1, further comprising monitoring metadata associated with the multimedia content.

3. The method of claim 2, wherein the metadata contain information related to:
   the start and end time of the second content;
   the position of the representative frame in the second content.

4. The method of claim 2, wherein the multimedia content is a video stream and the metadata includes manifest files.

5. The method of claim 2, wherein the multimedia content is a broadcast content and the metadata is embedded in-band or out-of-band.

6. The method of claim 1, wherein the speed of fast-forward is controlled according to a normal distribution if the second content includes at least one representative frame positioned at the beginning of the second content and at least one representative frame positioned at the end of the second content.

7. The method of claim 1, wherein the speed of fast-forward is controlled according to an exponential distribution if the second content includes at least one representative frame positioned only at the beginning of the second content.

8. The method of claim 1, wherein the speed of fast-forward is controlled according to a negative exponential distribution if the second content includes at least one representative frame positioned only at the end of the second content.

9. The method of claim 1, wherein, when the second content includes a plurality of representative frames distributed at a plurality of positions of the second content, the method includes:
   splitting the second content into a plurality of samples, in which each representative frame is positioned at the end of a corresponding sample; and
   controlling the speed of fast-forward according to a negative exponential distribution within each sample.

10. The method of claim 1, wherein the speed of fast-forward depends on the duration of the second content.

11. A renderer device, for delivering a multimedia content, the multimedia content including at least one second content, the renderer device comprising at least one processor configured, during rendering of the multimedia content, to:
   detect a start of the second content;
   perform a fast-forward with a controlled variable speed during the rendering of the second content, in which the speed is controlled such that at least one representative frame of the second content is completely rendered;
   detect an end of the second content; and
   stop the fast-forward.

12. The renderer device of claim 11, wherein the renderer device is set-top box or a television set or a digital video recorder, DVR, or a tablet or a smart-phone.

13. A non-transitory computer-readable medium storing computer-executable instructions to enable a computer to:
   detect a start of a second content,
   wherein a multimedia content includes the second content;
   perform a fast-forward with a controlled variable speed during rendering of the second content, in which the speed is controlled such that at least one representative frame of the second content is completely rendered;
   detect an end of the second content; and
   stop the fast-forward.

14. The method of claim 1, wherein the speed of fast-forward is further controlled such that at least one representative frame positioned at the beginning of the second content is completely rendered and such that at least one representative frame positioned at the end of the second content is completely rendered.

15. The method of claim 1, wherein the speed of fast-forward is controlled according to an exponential distribution.

16. The method of claim 1,
wherein the multimedia content is a live program, and
wherein performing the fast-forward comprises rendering a portion of the multimedia to catch up with the live program.

17. The renderer device of claim 11, wherein the at least one processor is further configured to monitor metadata associated with the multimedia content.

18. The renderer device of claim 11, wherein the at least one processor is further configured, when the second content includes a plurality of representative frames distributed at a plurality of positions of the second content, to:
  split the second content into a plurality of samples, in which each representative frame is positioned at the end of a corresponding sample; and
  control the speed of fast-forward according to a negative exponential distribution within each sample.

19. The renderer device of claim 11, wherein the speed of fast-forward depends on the duration of the second content.

20. The renderer device of claim 11,
wherein the multimedia content is a live program, and
wherein performing the fast-forward comprises rendering a portion of the multimedia to catch up with the live program.

* * * * *